W. JOHNSON.
COMBINED EMERGENCY AND THROTTLE VALVE.
APPLICATION FILED AUG. 15, 1907.

921,997.

Patented May 18, 1909.
5 SHEETS—SHEET 1.

Witnesses:
Marcus L. Byng.
J. Ulri Ulen

Inventor,
Werner Johnson,
By Albert G. Davis
Att'y.

W. JOHNSON.
COMBINED EMERGENCY AND THROTTLE VALVE.
APPLICATION FILED AUG. 15, 1907.

921,997.

Patented May 18, 1909.
5 SHEETS—SHEET 2.

Witnesses:
Marcus L. Byng.
J. Ellis Glen

Inventor,
Werner Johnson,
By Albert H. Davis
Atty.

W. JOHNSON.
COMBINED EMERGENCY AND THROTTLE VALVE.
APPLICATION FILED AUG. 15, 1907.

921,997.

Patented May 18, 1909.
5 SHEETS—SHEET 4.

Witnesses:
Marcus L. Byng
J. Ellis Glen

Inventor,
Werner Johnson,
By
Att'y.

W. JOHNSON.
COMBINED EMERGENCY AND THROTTLE VALVE.
APPLICATION FILED AUG. 15, 1907.

921,997.

Patented May 18, 1909.
5 SHEETS—SHEET 5.

Witnesses:
Benjamin B. Hull
Helen Oxford

Inventor:
Werner Johnson,
by Albert G. Davis
Att'y.

UNITED STATES PATENT OFFICE.

WERNER JOHNSON, OF LYNN, MASSACHUSETTS, ASSIGNOR TO GENERAL ELECTRIC COMPANY, A CORPORATION OF NEW YORK.

COMBINED EMERGENCY AND THROTTLE VALVE.

No. 921,997.          Specification of Letters Patent.          Patented May 18, 1909.

Application filed August 15, 1907. Serial No. 388,600.

*To all whom it may concern:*

Be it known that I, WERNER JOHNSON, a citizen of the United States, residing at Lynn, county of Essex, State of Massachusetts, have invented certain new and useful Improvements in Combined Emergency and Throttle Valves, of which the following is a specification.

The present invention has for its object to improve the construction of combined emergency and throttle valves, and more especially by providing a means whereby the same hand-wheel which opens and closes the valve under normal conditions is utilized to reset or restore the motor which closes the valve under emergency conditions, and also to reset the emergency tripping mechanism.

In the accompanying drawings which illustrate one of the embodiments of my invention.

The invention is shown in connection with a combined emergency throttle valve which is unbalanced when open and therefore has a tendency to close when released. Owing to the size of the main valve and to the heavy pressure to which it is subjected when closed, a pilot valve is provided which opens in precedence to the main valve and closes before it. When steam is flowing through the valve casing the main and pilot valves are locked in their respective open positions. In order to insure a quick and certain closing of the valve under emergency conditions, a motor, such as a weight is provided which in falling first releases the lock and then starts the pilot and the main valve into motion, after which the unbalanced pressures to which the valves are subjected cause them to close, the weight, however, being effective as a closing agent from the moment it first strikes an abutment on the valve stem with a hammer blow until both valves are seated.

Figure 5:
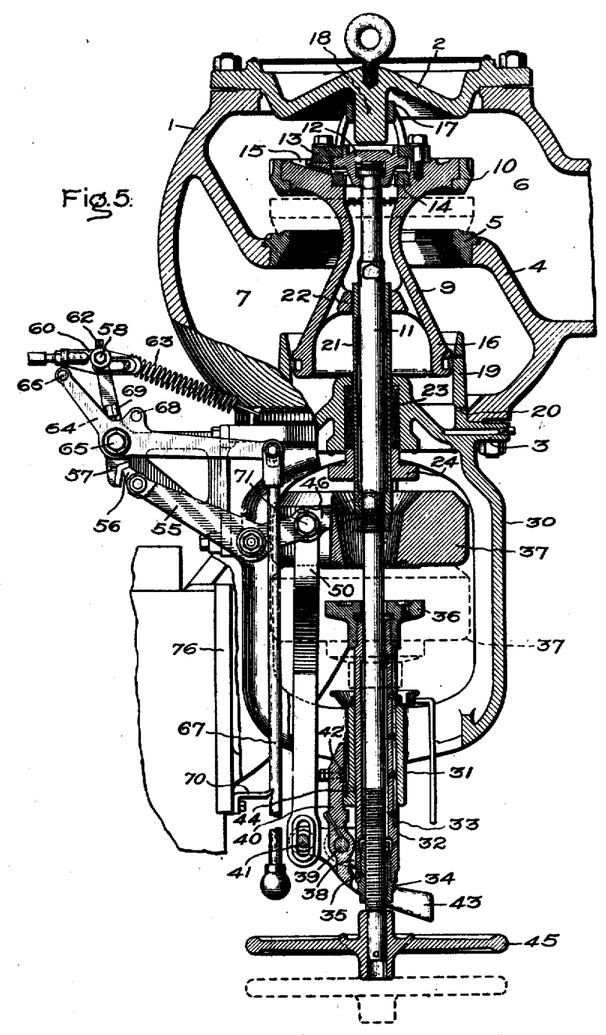
Fig. 5 is a longitudinal section of the valve.

Referring to Fig. 5, the construction of the valve will be described. 1 indicates the valve casing which is provided with a removable upper head 2 and a removable lower head 3. Extending across the interior of the valve is a partition 4 that is bored centrally to support the seat 5. This partition divides the valve casing into two chambers or compartments 6 and 7, the former receiving steam from the boiler and the latter communicating by means of the conduits 8, Fig. 1, with the valve chests admitting steam to the turbine or other apparatus to be controlled. 9 indicates the valve which is provided with a removable wearing portion 10 that is screw-threaded thereto. The vave 9 has a tubular portion and extending therethrough is a stem 11, the upper end of which is provided with an enlarged head which is seated in the pilot valve 12. The pilot valve is provided on its upper side with a shoulder which engages with and is guided by the ring 13, the latter being secured to the main valve by bolts. Formed on the ring 13 or attached thereto is an annular guide 17 which engages a downwardly extending projection 18 on the upper head to guide the valve. Situated under the pilot valve is a seat 14. From this it will be evident that the main valve is capable of being moved by the pilot valve and its stem. Steam is admitted to the pilot valve and to the chamber within the valve by one or more passages 15. When the parts occupy the position shown, steam is admitted to the interior of the valve and to the under side of the piston 16 connected therewith, by the tubular portion or piston 9, and such being the case the valve is largely balanced. The piston 16 is mounted for movement in the cylinder 19, the latter being formed integral with the lower head 3. A suitable packing is provided between the piston and the cylinder to minimize leakage. At the lower end of the cylinder is a small orifice 20 through which water due to condensation can pass from the interior of the cylinder to the chamber 7.

Surrounding the valve stem and protecting it is a sleeve 21 which snugly fits the stem at its upper and lower ends. The upper end passes through a guide 22 formed in the piston 9. The lower end passes through a packing 23 and a gland 24 to prevent leakage. The sleeve is held in place on the spindle or stem by means of a shoulder and a nut at the lower end so that the expansion and contraction thereof will not interfere with the proper working of the valve. The valve stem may with advantage be made of nickel steel on account of its strength and the sleeve of bronze or other non-rusting material. This prevents sticking of the parts.

The main valve is so constructed and arranged that it is balanced when open except for the stem which is subjected to the full pressure of the steam at one end and to atmospheric pressure at the other. By changing the diameter of the sleeve 21 this difference in pressure can be increased or decreased to suit the requirements.

Formed integral with the lower head 3 is a frame 30 which is substantially rectangular in outline. The lower end is provided with a boss 31 which is bored centrally to receive the valve stem. Surrounding the stem at this point is a sleeve 32 having a spline 33 mounted thereon and entering a slot in the boss 31 to prevent the same from turning. The lower end of the sleeve is screw-threaded internally to receive the nut 34, the latter being screw-threaded externally to receive the threads on the sleeve and internally to engage the threads on the valve spindle 11. After this nut is adjusted to its proper position with respect to the sleeve 32 they are held against relative movement by the pin 35 which extends perpendicular thereto. On the upper end of the sleeve 32 is a head or abutment 36 which receives the blow imparted by the weight or other motor 37 when the latter is released and permitted to fall. The motor preferably acts by impact since it will start the valve into motion with certainty. The motor is located outside of the steam space so as not to be affected by the action of the steam.

Figure 3:
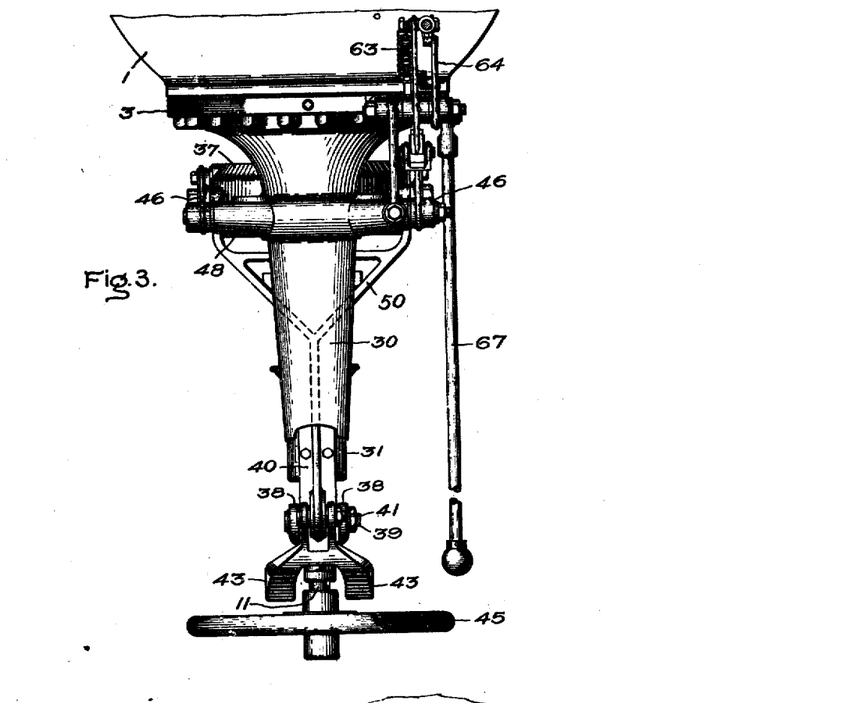
Fig. 3 is a view in side elevation of the tripping mechanism of the valve.
Figure 4:
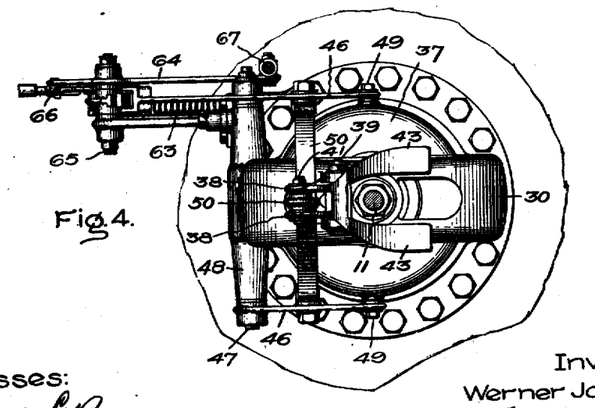
Fig. 4 is an inverted plan view of the same with the hand wheel removed.

On the lower end of the sleeve 32 are two arms 38 forming a fork to receive the pivot 39 for the valve locking lever 40. This lever comprises three principal portions. The first portion carries the pin 41, the second carries a block 42 which forms a part of the lock for holding the main valve open, and the third portion comprises a weight 43 which tends at all times to keep the parts in position as shown in Fig. 5. That is to say to lock the valve parts in operative position. In order that there shall be no tendency for the parts of the lever to move out of their normal plane of operation and therefore bind the portion of the lever carrying the pin 41 a part is made in the form of a fork, as best shown in Figs. 3 and 4. The weight 43 is also made in two portions for the same reason and also to facilitate assembling.

The lower end of the frame boss 31 is provided with a shoulder to receive the hardened wearing block 44, the latter engaging with the block 42 on the locking lever.

On the lower end of the valve stem is a hand wheel 45 by means of which the valve can be opened and closed or adjusted to any given position to insure any desired degree of throttling. The dotted lines show the position of the hand wheel when the valve is closed.

Figures 6, 7:
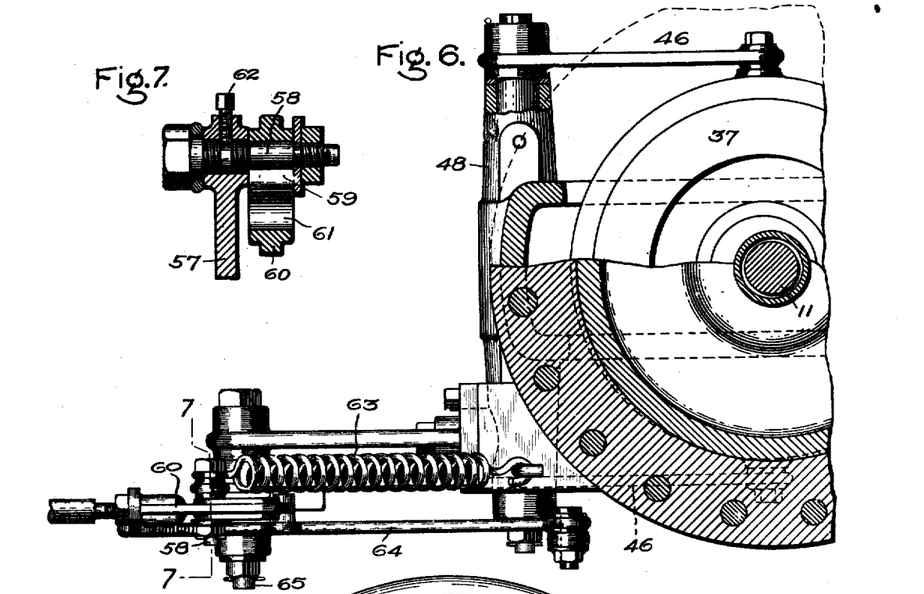
Fig. 6 is an enlarged sectional view showing a part of the tripping mechanism.
Fig. 7 is a detail sectional view taken on line 7—7 of Fig. 6.
Figure 8:
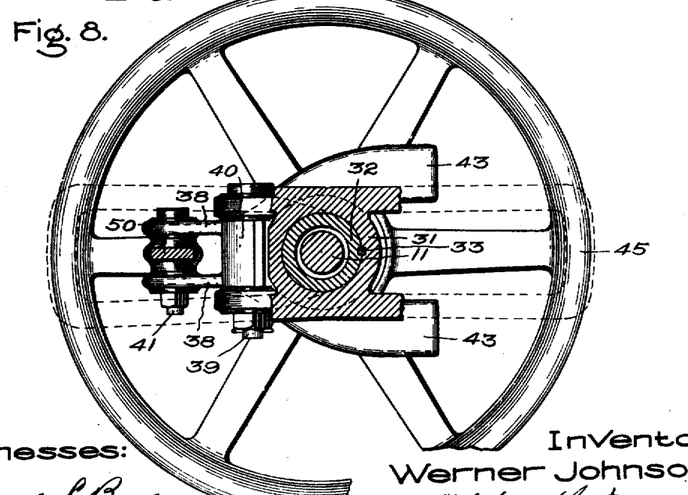
Fig. 8 is a sectional view taken just above the lock which holds the valve in its open position.
Figure 9:
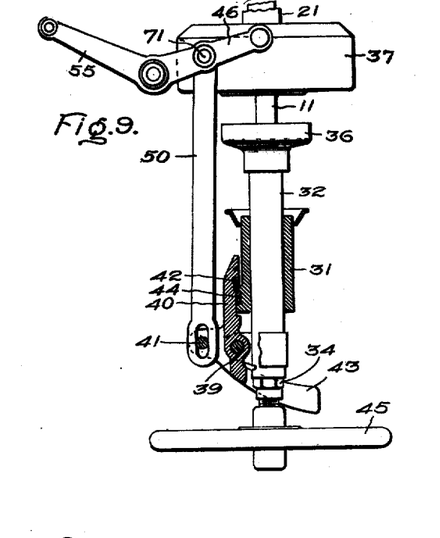
Fig. 9 is a detail view showing the position of the weight and the associated parts when the valve is open.

The weight 37 is normally sustained in the position shown by means of two levers 46 which are supported by a pivot 47 located in the bosses 48 on the frame 30 as best shown in Fig. 4. These levers are united to the weight 37 by pivots 49. The parts of the lever 46 are united by a forked-link 50 which is slotted at its lower end to receive the pin 41 on the locking lever. Between the pin and the upper end of the slot is a certain amount of space, the object of which is to form a lost motion connection between the weight and the valve lock so that when the weight falls it will act with a hammer blow first on the lock and then on the head 36 and the valves connected therewith. It will be observed that the distance between the pin 41 and the upper end of the slot in the link is less than the distance between the upper side of the head 36 and the under surface of the weight 37, the object of which is to insure the successive operation of the lock and the movement of the valve stem. In order to hold the weight in the suspended position, one of the levers 46 is extended as at 55 to the left of its pivot. Mounted in the end thereof is a pivoted block 56 which engages a shoulder formed in the lower end of the tripping lever 57. The object in using a pivoted block is to facilitate resetting. In resetting the block will tilt back to allow the lever 55 to resume its normal position. The lever 57 is carried by a bracket which is bolted to the frame 30 of the valve. On the upper end of the tripping lever 57 is a pin 58, Figs. 5 and 7, which pin normally stands in the position shown, that is, in the vertically extending slot 59 in the member 60 which communicates with a horizontally extending slot 61 at its lower end. The pin 58 is threaded into the lever 57 and is prevented from moving endwise by the set screw 62. To one end of the pin 58 is secured the extension spring or motor 63 which tends at all times to move the upper end of the lever 57 to the right, Fig. 5, and release levers 55 and 46 and their suspended weight. In order to close the valve manually through the medium of the weight, a lever 64 is provided which is mounted on the spindle 65, the latter also carrying the lever 57. On the left hand end of the lever is a pin 66 which is adapted to engage the member 60 containing the slots 59 and 61 and raise the same by an amount sufficient to let the pin 58 enter the slot 61 when the motor or spring 63 will pull the shoulder on the lower end of lever 57 out of the path of the block 56 and permit the weight to fall. From the right hand end of the lever 64 depends a rod 67 by means of which the station attendant can actuate the releasing mechanism by hand.

The means for resetting the levers will now be described. Mounted on the manually actuated lever 64 is a projection 68 which, when it is moved to the left about its axis, is adapted to engage with a projection 69 on the lever 57 and move the same to the position shown in Fig. 5 where the shoulder on the lever 57 is in a position to receive the block 56. The pin 58 enters the locking slot 59 in the member 60 after it and its connected rod are moved to their normal positions. This lever is normally held in the position shown by a detent 70 which enters a notch in the depending rod 67.

The description will now be directed to the valve as applied to a turbine for controlling it and to the means employed for releasing the weight when the speed of the turbine becomes abnormally high or when for any reason it is desired to suddenly close the valve.

Figure 1:
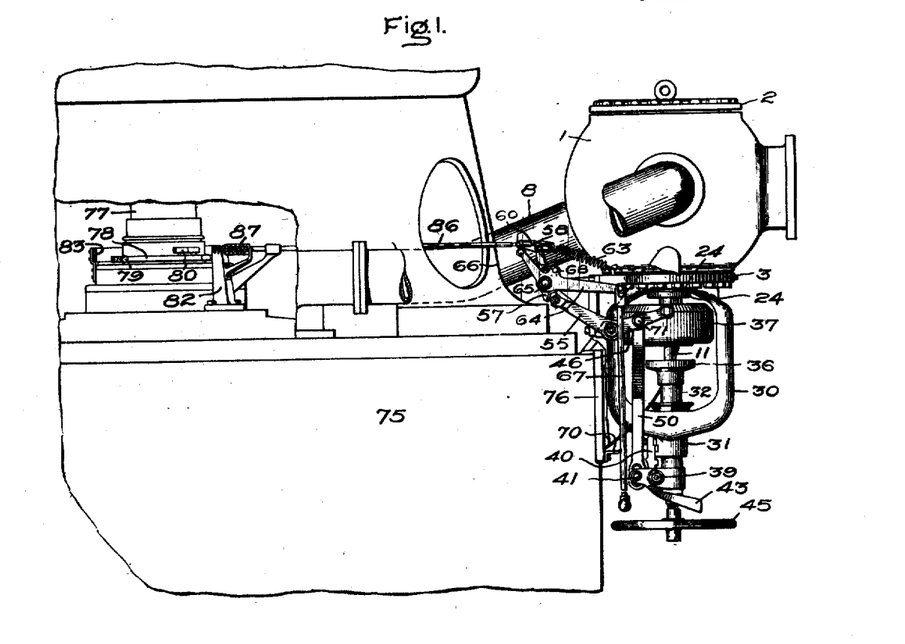
Figure 1 is a partial view in side elevation of a vertical shaft turbine equipped with my improved valve.

75, Fig. 1, represents the casing of the turbine which is suitably finished to receive the bracket 76 formed on or attached to the casing of the valve.

77 indicates the vertical shaft of the turbine and mounted thereon is a collar 78 made up of two parts which are hinged together and secured by the clamping bolt 79. Carried by the collar and located at diametrically opposite points are springs 80 coiled after the fashion of a clock spring with free ends, which ends upon a predetermined increase of speed, increase their orbit and operate a tripping lever 81 that is pivotally supported on a bracket 82 located adjacent to the emergency governor. Surrounding the governor is a cylinder guard 83 through which the end of the tripping lever 81 projects. The tripping lever is provided with a hooked-like portion 84 which engages with a shoulder 85 formed on the tension rod 86, the latter being suitably guided in its longitudinal movement. The tripping lever is normally held with the end inside of the guard by the tension spring 87. The portion 85 is purposely made of considerable length so that when the emergency governor springs 80 actuate the tripping lever 81 it will engage the right hand end of the lever and hold the opposite end out of the path of the springs. The shield or guard 83 prevent the springs from overreaching and becoming injured.

The valve can be opened or closed by the hand wheel 45 for normal operation the same as other valves.

Figure 10:
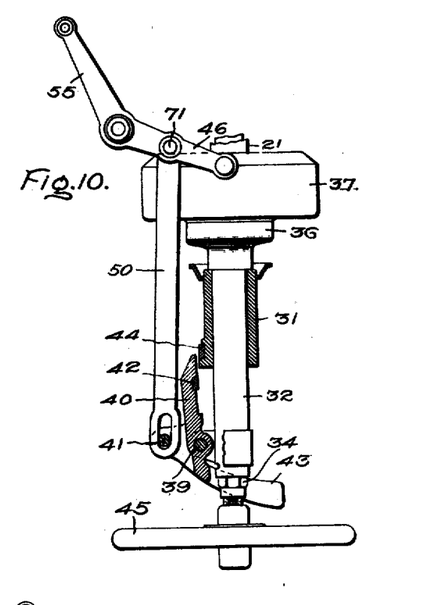
Fig. 10 shows the relation of parts when the valve is closed.

The automatic operation of the valve and its tripping mechanism is as follows: Assuming the valve to be open and that the speed increases abnormally, say 10% above the normal, the springs will strike the tripping lever 81 and by moving it releases the rod 86 and the spring 63, Fig. 5, will pull the upper end of the lever 57 to the right, thereby releasing the weight supporting levers 55 and 46. As the weight 37 drops, its first action is to move the pin 41 by a hammer blow and release the lock 42—44; subsequently it strikes the head 36 with a hammer blow which seats the pilot valve 12. The impact also starts the main valve into operation. As soon as the pilot valve is closed the semi-balanced relation of the parts is further upset, steam pressure is cut off from the cylinder space below the piston 16, and the steam pressure closes the valve and holds it firmly against its seat. See Fig. 10.

In order that some idea may be had of the size of the valve and the pressures to which such valves are subjected, the present valve has a fourteen inch opening and when the pilot and main valves are closed there is at 200 pounds boiler pressure approximately 48,000 pounds pressure tending to hold it against its seat.

Figure 2:
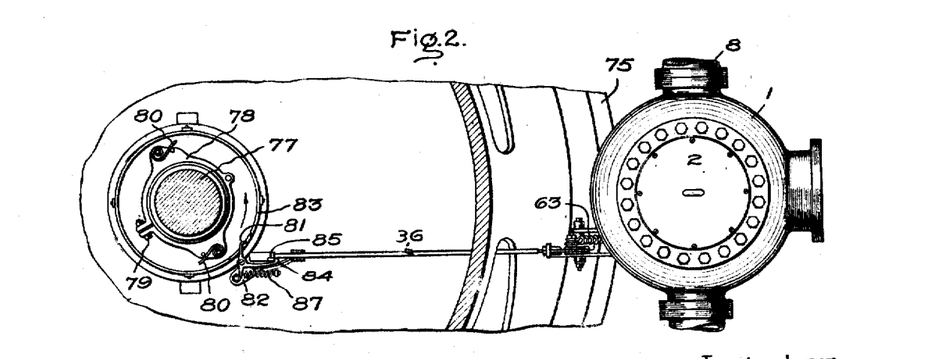
Fig. 2 is a partial horizontal section showing the emergency governor for tripping the valve.
Figure 11:
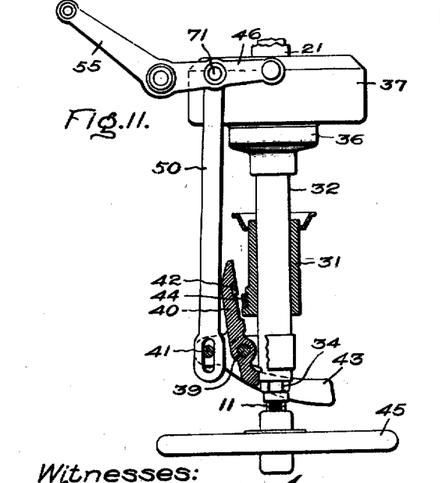
Fig. 11 shows the parts at an intermediate stage of the resetting operation.
Figure 12:
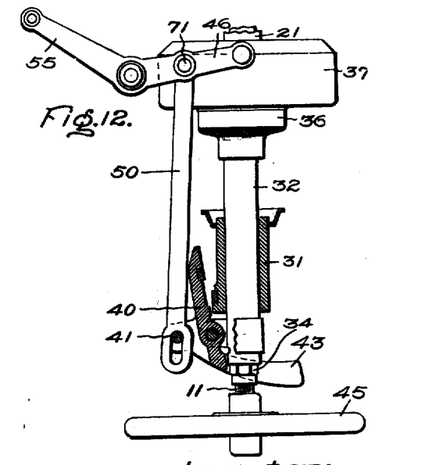
Fig. 12 shows the weight just before it leaves the head owing to the differential arrangement of the threaded stem and nut and the levers.

Assuming now that it is desired to reset the emergency mechanism and open the valve: The speed governor springs return of themselves to the normal position when the speed of the engine is reduced to normal. The rod 86 is latched back as shown in Figs. 1 and 2. The hand wheel 45 is then rotated to the right and, owing to the fact that the spindle is free to turn at the upper end and also to the fact that the steam pressure on the main and pilot valves is heavy and holds the stem against the longitudinal movement, the nut 34 thereon moves up the spindle or stem carrying with it the locking lever, the head or abutment 36 and the weight 37, Fig. 11. Just as soon as the pin 41 reaches the upper end of the slot in the bottom end of the link 50, Fig. 12, a different action takes place; the work of lifting the weight being transferred to the pin 41, link 50 and levers 46. Since the connecting pins 71 of the links are between the axis of the levers and the points of connection with the weight, it follows that for a given vertical movement of the pins and nut the weight will have a greater movement, hence from this point the latter will move more rapidly than the head. It is this differential movement of the nut and hand wheel and the weight which causes the latter to assume an operating position.

To state the matter in another way the head has a certain definite movement up and down while the weight has a greater up and down movement. In falling, the weight moves a certain distance, gradually acquiring momentum, before it strikes the head, after which the parts move together. When the weight has been raised the required amount the lever 55 will have moved downward until the pivot block 56 drops into engagement with the shoulder on the lever 57, after which the direction of the hand wheel is reversed for the valve-opening movement. The reverse movement moves the pin 41 down and permits the block 56 to sustain the weight. At the same time the weight 43 on the locking lever causes the block 42 to engage the block 44 that is rigidly secured to the hub-like projection on the valve frame 30. This results in locking the nut 34 against the longitudinal movement. Continued rotation in the same direction will now cause the valve stem to move upward in the nut and the pilot valve to fully open and thereafter the main valve. The latter may be opened partially or wholly. Under normal conditions the valve will be slowly opened so as to throttle the steam or other motive fluid at starting, and will be fully opened after normal speed of the apparatus is attained. The valve can be opened or closed by the hand wheel, or closed by releasing the weight sustaining levers by the rod 67 or by the centrifugal governor on the turbine. When the valve is tripped manually by the rod 67 it will be reset before resetting or restoring the weight and opening the valve.

I have shown a weight as the preferred form of motor for actuating the valve since it is reliable and effective at all times in its operation, but I may use some other form of motor when desired and reset the same by suitable differential acting means. In a large valve of this character the weight is too heavy to be lifted directly by hand (in the valve illustrated it weighs about 400 pounds) hence the importance of a power multiplying device for resetting is apparent.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a casing, a valve located therein, a stem for the valve which has a threaded portion, a nut coöperating with the threaded portion of the stem and mounted for longitudinal movement in the casing, a suspended weight, means for normally holding the weight and nut in a fixed position, means for releasing the weight and nut so that the weight may forcibly move the valve under certain conditions, means for resetting the weight and nut, and a wheel for rotating the stem in the nut in one direction to cause said means to reset the weight and nut and for rotating it in either direction after they are reset to open or close the valve.

2. In combination, a casing, a valve located therein, a hand wheel and threaded stem for opening and closing the valve under certain conditions, a threaded nut coöperating with the stem and through which it passes, a lock normally restraining the nut against longitudinal movement, a motor for actuating the valve under certain conditions, and differentially acting means for resetting the motor and returning the nut to its normal position.

3. In combination, a casing, a valve located therein, a wheel, a threaded valve stem and a nut coöperating with the wheel for opening and closing the valve, a lock normally holding the nut in a given position, a weight which in falling first releases the lock and thereafter closes the valve, and differentially acting means actuated by the wheel for resetting the nut and the weight, the latter having a greater movement than the nut.

4. In combination, a casing, a valve located therein, a wheel, a threaded valve stem and a nut coöperating with the wheel for actuating the valve, a head connected to the stem, a lock normally holding the nut in a given position against longitudinal movement, a motor external to the casing for actuating the lock in a manner to release the nut and close the valve under certain conditions, means for releasing the motor and permitting it to strike the head with a hammer blow to close the valve, and differentially acting means common to the motor, nut and head and actuated by the wheel for resetting them.

5. In combination, a casing, a valve mounted therein, a stem for the valve, a lock for holding the valve in an open position comprising two principal members, one of which is fixed with respect to the casing while the other is movable longitudinally with the valve stem, a suspended weight which in falling first releases the lock and then imparts a hammer blow to the valve through its stem to close said valve, a means for suspending the weight, and a device for releasing the weight under certain conditions to permit it to fall by gravity.

6. In combination, a casing, a valve mounted therein, a threaded stem for the valve, a nut mounted for longitudinal movement in the casing and with which the threaded portion of the stem engages, a pivoted locking device carried by the nut which holds the valve in an open position, a suspended weight which in falling first releases the locking device and subsequently starts the valve into motion, imparting a hammer blow to both the locking device and valve, a means for suspending the weight, and a restraining device for said means.

7. In combination, a casing, a valve mounted therein, a stem for the valve, means for operating it under normal conditions to open and close the valve, an abutment on the stem, a weight for closing the valve under emergency conditions, a lever pivotally engaging the weight and normally suspending it above the abutment, a locking device for restraining the lever, and means for releasing said lever from the locking device to permit the weight to drop and strike said abutment to close the valve.

8. In combination, a casing, a valve mounted therein, a stem for the valve, a lock for holding the valve in a given position, a suspended weight which in falling first releases the lock and then starts the valve into motion, imparting a hammer blow to both the lock and valve, a lever for suspending the weight, a second lever engaging one end of the first to hold it in place, and a lock for the second lever.

9. In combination, a casing, a valve mounted therein, a stem for the valve, a lock which holds the valve in an open position, a suspended weight which in falling first releases the lock and then starts the valve into motion, a frame secured to the valve casing, a lever pivotally mounted on the frame, one end of which suspends the weight, a second lever, one end of which normally engages one end of the first, and a means acting on the opposite end of the second lever to hold the same in a fixed position.

10. In combination, a casing, a valve mounted therein, a stem for the valve, a lock which holds the valve stem in any given position, a suspended weight which in falling first releases the lock and then starts the valve into motion, a means supporting the weight, a lock normally holding the means in a fixed position, and a motor which suddenly moves the lock out of the path of the said means when it is released.

11. In combination, a casing, a valve therein which is unbalanced as to pressures and has a tendency to close, a valve stem, means coöperating with the stem to hold the valve open under normal conditions, a suspended weight which in falling releases said means and assists in closing the valve, a lever for suspending the weight, a second lever engaging the first to hold the weight in place, a motor which tends at all times to move the second lever in a direction to cause it to release the weight, a lock restraining the motor, and a governor which opens the lock under certain predetermined conditions.

12. In combination, a casing, a valve therein which is unbalanced as to pressures and has a tendency to close, a valve stem, a lock coöperating with the stem to hold the valve in any given position, a suspended weight which in falling releases the lock, means restraining the weight comprising a lever engaging said weight, a second lever engaging the first to hold the weight in place, a lock for the second lever, a governor responsive to load changes for releasing the lock and freeing the weight from said restraining means, and a motor which performs the work of moving said means when the lock is released by the governor.

13. In combination, a valve, a casing therefor, a stem for the valve which is exposed to the pressure of the fluid within the casing on one end and to atmospheric pressure on the other, a frame through which one end of the stem passes, a weight surrounding the stem, a sleeve threaded to the stem, a locking member carried by the sleeve and coöperating with a member carried by the frame, a means actuated by the weight for releasing the locking members, a weight sustaining means, and mechanism for releasing the weight when it is desired to close the valve.

14. In combination, a valve, a casing therefor, a stem for the valve which is exposed to the pressure of the fluid within the casing at one end and to atmospheric pressure on the other, a frame through which one end of the stem passes, a weight surrounding the stem, a sleeve threaded to the stem, a locking member carried by the sleeve and coöperating with a member carried by the frame, a lever for supporting the weight, a connection between the lever and the locking member carried by the sleeve, and mechanism for releasing the lever and permitting the weight to fall and release the lock.

15. In combination, a valve, a casing therefor, a threaded stem for the valve, a frame through which the stem passes, a pivotally supported weight, a sleeve threaded to the stem and mounted for longitudinal movement in the frame, an abutment carried by the sleeve which is struck by the weight in falling to close the valve, a lock for sustaining the weight in its raised position, and a manually actuated means for releasing the lock and permitting the weight to fall.

16. In combination, a valve, a casing therefor, a threaded stem for the valve, a frame through which the stem passes, a pivotally supported weight, a sleeve threaded to the stem, an abutment carried by the sleeve which is struck by the weight in falling, a lock for sustaining the weight in its raised position, a second lock acted upon by the weight for holding the valve in any of its open positions, and a means releasing the lock for the weight and permitting it to fall and release the second lock and thereafter strike the abutment and assist in closing the valve.

17. In combination, a valve, a casing therefor, a threaded stem for the valve, a suspended weight, a sleeve threaded on the stem, an abutment carried by the stem and separated from the weight by a space, a lock for holding the valve in any of its positions, a lost-motion connection between the weight and the lock for releasing the latter by a hammer blow, the amount of lost motion being less than the space between the weight and the abutment so that the weight in falling will first release the lock and thereafter assist in closing the valve, and a means normally suspending the weight.

18. In combination, a valve, a casing therefor, a threaded stem for the valve which is unbalanced as to pressures, a pilot valve which opens in precedence to the main valve to balance the fluid pressures thereon, a sleeve threaded to the stem, a spline preventing the sleeve from turning but permitting it to move longitudinally, an abutment on the sleeve, a wheel on the stem for rotating it within the sleeve to first open the pilot valve and then the main valve, a lock, one member of which is carried by the stem while the other is fixed in position, a suspended weight which in falling first opens the lock and thereafter strikes the abutment causing it to close the pilot valve and thereafter to assist in closing the main valve, a device for normally suspending the weight, and means for releasing said device and permitting the weight to fall.

19. A valve comprising a casing, and main and pilot valves, in combination with a lock for holding the valves open, a suspended weight which in falling releases said lock and then closes the valves, a pivotal support for the weight, a lever that acts as a lock for the support, a means normally holding the lever in a fixed position, a releasing device for the means, and a motor which suddenly moves the lever out of the path of the weight support and permits the weight to fall and close the valves.

20. A valve comprising a casing, main and pilot valves and a stem therefor, in combination with a gravity actuated lock for holding the valves in open positions, a pivotally supported weight, an abutment carried by the stem, a connection between the weight and the lock for releasing the latter, a pivoted lever, one end of which engages the support for the weight, a locking member for the other end of the lever, and a means for releasing the locking member to permit the weight to fall to release the lock and by striking the abutment to close the valves.

21. In combination, a valve which is unbalanced and has a tendency to close, a stem therefor, a sleeve threaded to the stem, means preventing the sleeve from turning but permitting it to move longitudinally, an abutment on the sleeve, a weight, a lever supporting it, a lock one portion of which is carried by the sleeve the other being fixed, a slotted link connected to the lever for releasing the lock prior to the striking of the abutment by the weight, a lever which acts as a locking means for the weight supporting lever, a manually actuated lever for releasing the locking lever, a governor controlled means for releasing the lock of the weight supporting lever, and a motor for moving the said lock out of the path of the weight supporting lever.

22. In combination, a valve, a casing therefor, a threaded stem for the valve, an abutment on the stem, a frame mounted on the casing through which the stem passes, a nut engaging the stem and mounted for longitudinal movement in the outer portion of the frame, a locking lever pivoted to the nut, a shoulder on the frame with which the lever engages to hold the nut against longitudinal movement, a weight surrounding the stem within the frame, a lever mounted on the frame and pivoted at one end to the weight for normally suspending the latter above the abutment, a locking device for the lever, a link connecting said lever with the locking lever, means for releasing the weight, lever and its locking device to permit the weight to drop and through the link to release the locking lever and then strike the abutment to move the nut and stem longitudinally to close the valve, and a wheel for rotating the stem.

In witness whereof, I have hereunto set my hand this ninth day of August, 1907.

WERNER JOHNSON.

Witnesses:
   John A. McManus, Jr.,
   Alex: F. Macdonald.